(12) United States Patent
Dressel et al.

(10) Patent No.: US 11,936,436 B2
(45) Date of Patent: Mar. 19, 2024

(54) EXTERNAL FRONTEND DEVICE AND FRONTEND SYSTEM

(71) Applicant: Rohde & Schwarz GmbH & Co. KG, Munich (DE)

(72) Inventors: Wolfgang Dressel, Munich (DE); Alexander Roth, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 17/547,648

(22) Filed: Dec. 10, 2021

(65) Prior Publication Data

US 2023/0188227 A1    Jun. 15, 2023

(51) Int. Cl.
*H04B 17/19* (2015.01)
*H04B 17/16* (2015.01)
*H04B 17/29* (2015.01)

(52) U.S. Cl.
CPC ............. *H04B 17/19* (2015.01); *H04B 17/16* (2015.01); *H04B 17/29* (2015.01)

(58) Field of Classification Search
CPC ......... H04B 17/19; H04B 17/16; H04B 17/29
See application file for complete search history.

(56) References Cited

U.S. PATENT DOCUMENTS

| 6,052,568 | A   | * | 4/2000  | Williams ........... H04B 7/18517 455/12.1 |
| 6,703,880 | B1  |   | 3/2004  | Gailhard et al. |
| 8,816,673 | B1  |   | 8/2014  | Barber |
| 9,194,946 | B1  | * | 11/2015 | Vacanti ................ G01S 13/286 |
| 2004/0043728 | A1 | * | 3/2004  | Rozenblit ............... H04B 1/04 455/112 |
| 2014/0021986 | A1 | * | 1/2014  | Scott ..................... H03B 21/025 327/156 |
| 2014/0357199 | A1 |   | 12/2014 | Otis et al. |
| 2016/0248524 | A1 | * | 8/2016  | Laaja ..................... H04B 17/12 |
| 2017/0352947 | A1 | * | 12/2017 | Solomko ............... H01Q 1/241 |
| 2018/0294832 | A1 | * | 10/2018 | Chi ......................... H03L 7/099 |
| 2018/0294834 | A1 | * | 10/2018 | Wang ....................... H03L 7/18 |

(Continued)

FOREIGN PATENT DOCUMENTS

WO    2021/000076 A1    1/2021

*Primary Examiner* — Junpeng Chen
(74) *Attorney, Agent, or Firm* — CHRISTENSEN O'CONNOR JOHNSON KINDNESS PLLC (57) ABSTRACT

An external frontend device is described. The external frontend device includes an integrated synthesizer circuit, a reference signal input, a receiver channel, a transmitter channel, and at least one mixer circuit. The reference signal input is configured to receive a low-frequency reference signal. The reference signal input is configured to forward the received low-frequency reference signal to the integrated synthesizer circuit. The integrated synthesizer circuit is configured to generate a local oscillator (LO) signal based on the low-frequency reference signal. The at least one mixer circuit is associated with the receiver channel and/or with the transmitter channel. The at least one mixer circuit is configured to mix the LO signal with a radio frequency (RF) signal processed by the receiver channel and/or with an intermediate frequency (IF) signal processed by the transmitter channel, thereby obtaining an IF output signal and/or an RF output signal, respectively. Further, a frontend system is described.

19 Claims, 3 Drawing Sheets

(56) References Cited

U.S. PATENT DOCUMENTS

| | | | |
|---|---|---|---|
| 2019/0097662 A1* | 3/2019 | Hornbuckle | H04B 10/69 |
| 2021/0203423 A1* | 7/2021 | Luo | H04B 7/0452 |
| 2022/0116193 A1 | 4/2022 | Gao | |
| 2023/0198638 A1* | 6/2023 | Cho | H04B 17/19 |
| | | | 455/552.1 |

* cited by examiner

EXTERNAL FRONTEND DEVICE AND FRONTEND SYSTEM

FIELD OF THE DISCLOSURE

Embodiments of the present disclosure generally relate to external frontend devices. Embodiments of the present disclosure further relate to frontend systems.

BACKGROUND

External frontends are often used in combination with measurement instruments such as spectrum analyzers. Usually, the external frontend receives an RF signal from an antenna connected to the external frontend, and a local oscillator (LO) signal from the measurement instrument.

The external frontend mixes the RF signal with the LO signal received from the measurement instrument, thereby generating an intermediate frequency (IF) signal. The IF signal is forwarded to the measurement instrument and analyzed by the measurement instrument in order to determine certain properties of the RF signal.

For high-frequency applications, such as 5G testing applications, the LO signal has to be a high-frequency signal in order to convert the RF signal into an appropriate IF signal. However, such high-frequency LO signals have the disadvantage that they can be transmitted only over a short distance due to the high transport losses associated with transmitting high-frequency signals via cables.

Thus, there is a need for an external frontend that allows for a more flexible placement of the external frontend when receiving high-frequency RF signals.

SUMMARY

Embodiments of the present disclosure are directed to external frontend devices. In an embodiment, an external frontend device comprises an integrated synthesizer circuit, a reference signal input, a receiver channel, a transmitter channel, and at least one mixer circuit. The reference signal input is configured to receive a low-frequency reference signal. The reference signal input is configured to forward the received low-frequency reference signal to the integrated synthesizer circuit. The integrated synthesizer circuit is configured to generate a local oscillator (LO) signal based on the low-frequency reference signal. The at least one mixer circuit is associated with the receiver channel and/or with the transmitter channel. The at least one mixer circuit is configured to mix the LO signal with a radio frequency (RF) signal processed by the receiver channel and/or with an intermediate frequency (IF) signal processed by the transmitter channel, thereby obtaining an IF output signal and/or an RF output signal, respectively.

The present disclosure is based on the idea to provide a low-frequency reference signal to the external frontend instead of a high-frequency LO signal. As only a low-frequency signal, namely the low-frequency reference signal, has to be transmitted to the external frontend device, the restrictions on the placement of the external frontend device are lifted, as the low-frequency reference signal can be transmitted with low losses.

The external frontend device, for example the integrated synthesizer circuit of the external frontend device, generates the LO signal necessary for obtaining the IF output signal and/or the RF output signal based on the low-frequency reference signal.

However, the external frontend device and the source of the low-frequency reference signal are synchronized nonetheless, as the LO signal is generated based on the low-frequency reference signal, for example based on an amplitude, frequency and/or phase of the low-frequency reference signal.

For example, the source generating the low-frequency reference signal may be a measurement instrument, such as a spectrum analyzer, a signal analyzer, a vector network analyzer, or an oscilloscope.

The IF output signal generated by the external frontend device may be forwarded to the measurement instrument for further analysis, for example in order to determine certain properties of the received RF signal.

Alternatively or additionally, the source generating the low-frequency reference signal may be established as a signal generator, for example as an arbitrary waveform generator.

The signal generator may generate and forward the IF signal to the external frontend device, such that the IF signal is appropriately processed by the transmitter channel of the external frontend device.

As already mentioned above, the external frontend device according to embodiments of the present disclosure allows for a free placement of the external frontend device with respect to a source of the reference signal.

Accordingly, the external frontend device can be placed in a test chamber, for example in order to test the external frontend device itself or an antenna connected to the external frontend device. A measurement instrument performing the corresponding measurements can be placed outside of the test chamber, as the reference signal can be transmitted over a large distance without considerable losses.

The external frontend device according to embodiments of the present disclosure has two different channels, namely the receiver channel and the transmitter channel.

In the receiver channel, a received RF signal is mixed with the generated LO signal, thereby obtaining the IF output signal. The IF output signal may be output to an external device, for example to a measurement instrument.

In the transmitter channel, an IF signal is received, for example from an external device such as a signal generator or a measurement instrument with an integrated signal generator. The received IF signal is mixed with the generated LO signal, thereby obtaining the RF output signal. The RF output signal may be output to an external device, such as an external RF antenna.

According to an aspect of the present disclosure, the integrated synthesizer circuit comprises a YIG oscillator, wherein the YIG oscillator is configured to generate the LO signal based on the low-frequency reference signal. Accordingly, the YIG oscillator may be controlled by the reference signal to generate the LO signal.

YIG oscillators are particularly advantageous, as they can be tuned over several octaves from approximately 0.5 GHz to approximately 100 GHz. Moreover, YIG oscillators exhibit particularly small phase noise.

Accordingly, a frequency of the LO signal may be between approximately 0.5 GHz and approximately 100 GHz.

According to another aspect of the present disclosure, a frequency of the low-frequency reference signal is smaller than or equal to 2 GHz. According to a further aspect of the present disclosure, a frequency of the low-frequency reference signal is smaller than or equal to 1 GHz.

In an embodiment of the present disclosure, a frequency of the low-frequency reference signal is smaller than or equal to 650 MHz. In a further embodiment of the present disclosure, a frequency of the low-frequency reference signal is smaller than or equal to 20 MHz. In a certain example, the frequency of the low-frequency reference signal may be equal to 10 MHz, 640 MHz, or 1 GHz.

An operational mode of the external frontend device may be switchable between different frequencies of the reference signal. In other words, the external frontend device may comprise a plurality of different operational modes, wherein each operational mode is associated with a particular frequency of the reference signal.

The operational mode of the external frontend device may be automatically adapted based on the frequency of the received reference signal.

Alternatively or additionally, the external frontend device may be configured to request a reference signal having a predetermined frequency based on the set operational mode of the external frontend device.

In some embodiments, the frequency of the generated LO signal may be different or equal between the different operational modes of the external frontend device.

In some embodiments, the external frontend device may further comprise a comb-signal input, wherein the comb-signal input is configured to receive a comb-signal, and wherein the external front-end device is configured to correct the IF signal and/or the IF output signal based on the received comb-signal. Therein, the received comb-signal may serve as an additional high-precision reference signal in time domain and/or in frequency domain in order to correct the IF signal and/or the IF output signal.

According to an aspect of the present disclosure, the external frontend may comprise an antenna port being connectable to at least one RF antenna. Accordingly, the external frontend device can be connected to the at least one RF antenna by the antenna port, such that RF signals can be received and/or transmitted via the at least one RF antenna.

Accordingly, the at least one RF antenna can be fed by the external frontend device with an RF signal to be transmitted. Alternatively or additionally, the external frontend device receives an RF signal from the at least one RF antenna.

In an embodiment of the present disclosure, the external frontend device may comprise at least one directional coupler and an analysis circuit, wherein the directional coupler and the analysis circuit are connected to the antenna port. In general, the directional coupler and the analysis circuit are configured to perform reflectivity measurements that are associated with the antenna port, for example with a connection between the external frontend device and an external RF antenna.

The analysis circuit and/or the directional coupler may be integrated into the external frontend device. Alternatively, the analysis circuit and/or the directional coupler may be established separately from the external frontend device.

According to another aspect of the present disclosure, the directional coupler may be configured to forward electric signals reflected at the antenna port to the analysis circuit. In other words, a reflected portion of an RF signal that is transmitted from an external RF antenna to the antenna port may be forwarded to the analysis circuit by the directional coupler. The analysis circuit may determine a reflection parameter based on an analysis of the reflected portion. The reflection parameter may be an S11 parameter of the external frontend device.

An aspect of the present disclosure provides that the directional coupler may be configured to forward electric signals reflected at an RF antenna that is connected with the antenna port to the analysis circuit. In other words, a reflected portion of an RF signal that is transmitted from the antenna port to the external RF antenna may be forwarded to the analysis circuit by the directional coupler. The analysis circuit may determine a reflection parameter based on an analysis of the reflected portion. The reflection parameter may be an S11 parameter of the RF antenna.

In a further embodiment of the present disclosure, the analysis circuit is configured to determine a voltage standing wave ratio (VSWR). Accordingly, the analysis circuit is configured to determine a ratio between the transmitted standing waves and the reflected standing waves of the RF signal that is transmitted from the external RF antenna to the antenna port or from the antenna port to the external RF antenna. The determined VSWR is a measure for the efficiency of the transmission of the RF signal from the external RF antenna to the antenna port or from the antenna port to the external RF antenna.

In some embodiments, at least one of the RF signal and the RF output signal may be a modulated signal. Accordingly, the IF output signal and/or the IF signal may be a modulated signal as well. This is possible, because the external frontend device according to the present disclosure has a bandwidth that is large enough for converting modulated signals.

According to an aspect of the present disclosure, the external frontend may comprise a first mixer circuit associated with the receiver channel and a second mixer circuit associated with the transmitter channel. The first mixer and the second mixer may each be connected to the integrated synthesizer circuit. Accordingly, the same generated LO signal may be forwarded to both the first mixer and the second mixer.

Moreover, both the transmitter channel and the receiver channel of the external frontend device in some embodiments may be synchronized with a source of the low-frequency reference signal, as the LO signal is generated based on the low-frequency reference signal.

In an embodiment of the present disclosure, a frequency of the IF signal and/or a frequency of the IF output signal is between 2 and 10 GHz. The external frontend device may comprise a plurality of different operational modes, wherein each operational mode is associated with a particular frequency (range) of the IF signal and/or with a particular frequency (range) of the IF output signal.

In some embodiments, the frequency (range) of the IF signal and/or the frequency (range) of the IF output signal may be selectable by user.

In a further embodiment of the present disclosure, a frequency of the RF signal and/or a frequency of the RF output signal is between 20 and 80 GHz. The external frontend device may comprise a plurality of different operational modes, wherein each operational mode is associated with a particular frequency (range) of the RF signal and/or with a particular frequency (range) of the RF output signal.

In some embodiments, the frequency (range) of the RF signal and/or the frequency (range) of the RF output signal may be selectable by user.

Embodiments of the present disclosure further provide frontend systems. In an embodiment, a frontend system comprises at least two external frontend devices described above. In some embodiments, the frontend system comprises two external frontends according to any one of the embodiments described above.

Regarding the advantages and further properties of the frontend system, reference is made to the explanations given above with respect to the external frontend device, which also hold for the frontend system and vice versa.

According to an aspect of the present disclosure, the at least two external frontends are cascaded. For example, the at least two external frontends may be arranged in parallel, such that at least two receiving channels and at least two transmitter channels are provided by the at least two external frontend devices.

In some embodiments, the at least two external frontend devices may receive the same reference signal, such that the two external frontends can be synchronized via the reference signal.

Alternatively or additionally, the at least two external frontend devices may comprise an LO signal input and/or an LO signal output. An LO signal generated by a first one of the at least two external frontend devices may be forwarded to a second one of the at least two external frontend devices via the LO signal output of the first one of the at least two external frontend devices and the LO signal input of the second one of the at least two external frontend devices.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
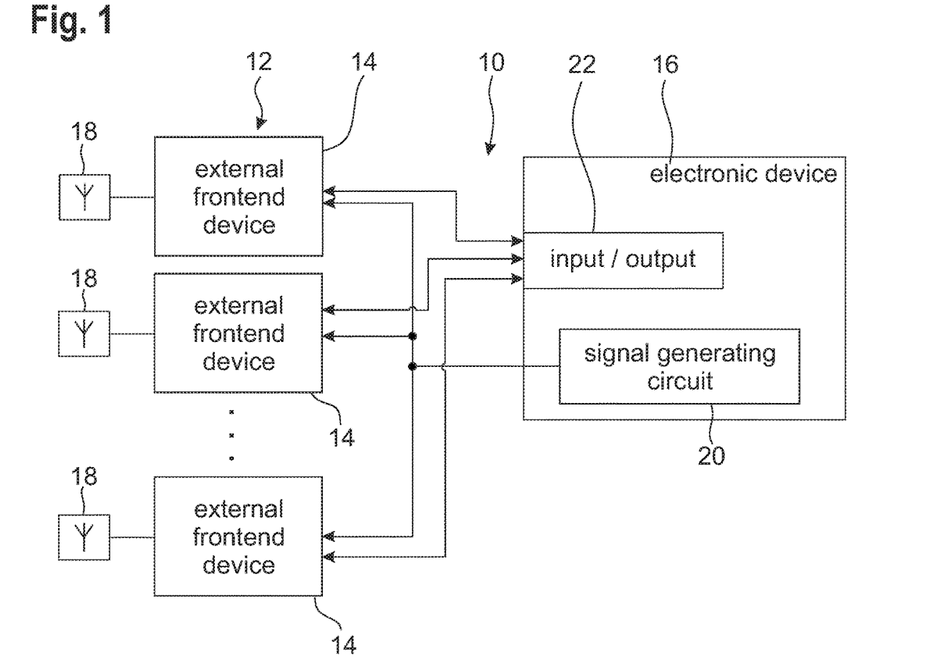
FIG. 1 schematically shows a frontend system according to an embodiment of the present disclosure.

FIG. 1 schematically shows a measurement and/or signal generation system 10 according to an embodiment of the present disclosure. As shown in FIG. 1, the measurement and/or signal generation system 10 comprises a frontend system 12 with several external frontend devices 14. The measurement and/or signal generation system 10 further comprises an electronic device 16 and several RF antennas 18.

In general, the electronic device 16 may be a measurement instrument, such as a spectrum analyzer, a signal analyzer, a vector network analyzer, or an oscilloscope.

Alternatively or additionally, the electronic device 16 may be established as a signal generator, for example as an arbitrary waveform generator.

The measurement and/or signal generation system 10 may also comprise several electronic devices 16, for example at least one measurement instrument and at least one signal generator.

The electronic device 16 comprises a signal generating circuit 20 that is connected with the external frontend devices 14 in a signal-transmitting manner, for example with each of the external frontend devices 14.

Therein and in the following, the term "connected in a signal transmitting manner" is understood to denote a suitable cable-based or wireless connection that is configured to transmit signals between the respective devices or components.

The signal generating circuit 20 is configured to generate a low-frequency reference signal and to forward the low-frequency reference signal to the external frontend devices 14, as will be described in more detail below. A frequency of the low-frequency reference signal may be smaller than or equal to 2 GHz, for example smaller than or equal to 1 GHz, smaller than or equal to 650 MHz, or smaller than or equal to 20 MHz. In a certain example, the frequency of the low-frequency reference signal may be equal to 10 MHz, 640 MHz, or 1 GHz.

The electronic device 16 may further comprise an input and/or output circuit 22 that is connected with the external frontend devices 14 in a signal-transmitting manner, for example with each of the external frontend devices 14.

In the embodiment shown in FIG. 1, the external frontend devices 14 are respectively connected with one of the RF antennas 18 in a signal-transmitting manner. However, it is also conceivable that several external frontend devices 14 are connected to one of the RF antennas 18, or that several RF antennas 18 are connected to the same external frontend device 14.

Figure 2:
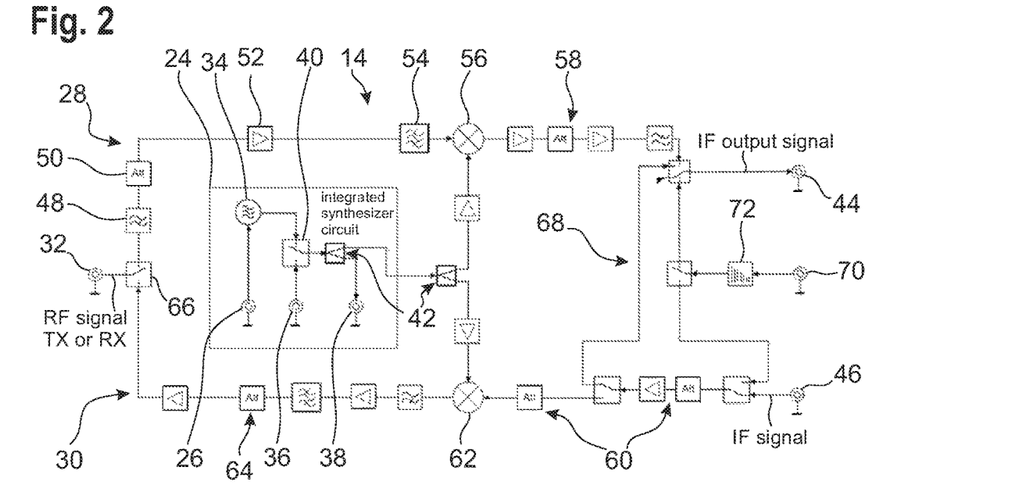
FIG. 2 schematically shows an external frontend device according to an embodiment of the present disclosure.

FIG. 2 shows one of the external frontend device 14 in more detail. In the embodiment of FIG. 2, the external frontend device 14 comprises an integrated synthesizer circuit 24, a reference signal input 26, a receiver channel 28, a transmitter channel 30, and an antenna port 32 associated with both the receiver channel 28 and the transmitter channel 30.

The reference signal input 26 is connected with the signal generating circuit 20 of the electronic device 16 and with the integrated synthesizer circuit 24, such that the low-frequency reference signal received from the signal generating circuit 20 is forwarded to the integrated synthesizer circuit 24. In general, the integrated synthesizer circuit 24 is configured to generate a local oscillator (LO) signal based on the received low-frequency reference signal.

In some embodiments, the integrated synthesizer circuit 24 comprises a YIG oscillator 34, wherein the YIG oscillator 34 is configured to generate the LO signal based on the low-frequency reference signal. Accordingly, the YIG oscillator 34 may be controlled by the low-frequency reference signal to generate the LO signal.

The YIG oscillator 34 can be tuned over several octaves from approximately 0.5 GHz to approximately 100 GHz. Accordingly, a frequency of the LO signal can be between approximately 0.5 GHz and approximately 100 GHz.

Therein, the YIG oscillator 34 or the generated LO signal is synchronized with the electronic device 16, as the LO signal is generated based on the low-frequency reference signal.

An operational mode of the external frontend device 14 may be switchable between different frequencies of the low-frequency reference signal. In other words, the external frontend device 14 may comprise a plurality of different operational modes, wherein each operational mode is associated with a particular frequency of the reference signal.

In some embodiments, the operational mode of the external frontend device may be automatically adapted based on the frequency of the received reference signal. Alternatively or additionally, the external frontend device may be configured to request a reference signal having a predetermined frequency from the electronic device 16.

In some embodiments, the frequency of the generated LO signal may be different or equal between the different operational modes of the external frontend device.

The low-frequency reference signal may be forwarded from the electronic device 16 to each of the external frontend devices 14, such that each external frontend device 14 generates a corresponding LO signal. As the individual LO signals generated by the different external frontend devices 14 are all generated based on the same reference signal, the LO signals are synchronized with each other.

Alternatively or additionally, the external frontend devices 14 each may comprise an LO signal input 36, an LO signal output 38, and a switching circuit 40, wherein the switching circuit 40 selectively connects the LO signal output 38 with the YIG oscillator 34 or with the LO signal input 36.

The external frontend devices 14 may be interconnected or cascaded, wherein the LO signal output 38 of one of the external frontend devices 14 is connected with the LO signal input 36 of the next external frontend device.

This way, a LO signal generated by the first external frontend device 14 in the cascade of external frontend devices 14 can be forwarded to the other external frontend devices 14 in the cascade.

Accordingly, the switching circuit 40 of the first external frontend device 14 connects the YIG oscillator 34 with the LO signal output 38. In the remaining external frontend devices 14 of the cascade, the switching circuit 40 connects the LO signal input 36 with the LO signal output 38.

Moreover, a splitter circuit 42 is provided upstream of the LO signal output 38, such that the generated or received LO signal is forwarded to the LO signal output 38, as well as to the receiver channel 28 and to the transmitter channel 30.

The external frontend device 14 may further comprise an IF signal output 44 that is associated with the receiver channel 28, and an IF signal input 46 that is associated with the transmitter channel 30.

In general, the receiver channel 28 is configured to receive and process an RF signal from the associated RF antenna(s) 18, thereby generating an IF output signal that is output via the IF signal output 44. For example, a frequency of the RF signal is between 20 and 80 GHz, while the frequency of the IF output signal may be between 2 and 10 GHz. In some embodiments, the RF signal may be a modulated signal. Accordingly, the IF output signal may be a modulated signal as well.

The RF signal received by the antenna port 32 may be pre-processed by a high-pass filter 48, an attenuator 50, an amplifier 52, and/or a band-pass filter 54, and is forwarded to a first mixer circuit 56. In some embodiments, the band-pass filter 54 may be established as a filter bank having several filters, for example two, three, four, five, six, seven, or more filters. It is noted that the received RF signal may be pre-processes by any other suitable electronic circuitry.

The first mixer circuit 56 mixes the pre-processed RF signal with the LO signal received from the integrated synthesizer circuit 24, thereby obtaining the IF output signal. In some embodiments, the IF output signal is processed by further electronic components 58 downstream of the first mixer circuit 56 before being forwarded to the IF signal output 44. The further electronic components 58 may comprise, for example, at least one amplifier, at least one attenuator, and/or at least one low-pass filter.

The IF output signal may be forwarded to the input and/or output circuit 22 of the electronic device 16 and may be analyzed by the electronic device 16 in order to determine certain properties of the received RF signal.

In some embodiments, the received RF signal may be a 5G signal, such that the certain properties of the received RF signal relate to 5G testing parameters.

In general, the transmitter channel 30 is configured to receive and process an IF signal from the electronic device 16 via the IF signal input 46, thereby generating an RF output signal that is output via the antenna port 32 For example, a frequency of the RF output signal is between 20 and 80 GHz, while the frequency of the IF signal may be between 2 and 10 GHz. In some embodiments, the RF output signal may be a modulated signal. Accordingly, the IF signal may be a modulated signal as well.

The IF signal received by the IF signal input 46 is pre-processed by electronic components 60 associated with the IF signal input 46, and is forwarded to a second mixer circuit 62. The electronic components 60 may comprise at least one amplifier, at least one attenuator, and/or at least one suitable filter.

The second mixer circuit 62 mixes the pre-processed IF signal with the LO signal received from the integrated synthesizer circuit 24, thereby obtaining the RF output signal. In some embodiments, the RF output signal is processed by further electronic components 64 downstream of the second mixer circuit 62 before being forwarded to the antenna port 32. The further electronic components 62 may comprise at least one amplifier, at least one attenuator, at least one high-pass filter and/or at least one band-pass filter.

The RF output signal may be forwarded to the respectively associated RF antenna(s) 18, such that the respectively associated RF antenna(s) 18 transmit the RF output signal.

Thus, the external frontend device 14 has a receiver mode, in which the RF signal is received and converted into the IF output signal. Moreover, the external frontend device 14 has a transmitter mode, in which the IF signal is received and converted into the RF output signal.

The external frontend device 14 may be switchable between the receiver mode and the transmitter mode. For example, the external frontend device 14 may comprise a mode switching circuit 66 that is configured to switch the external frontend device 14 between the receiver mode and the transmitter mode.

In some embodiments, the mode switching circuit 66 is configured to connect the receiver channel 28 with the antenna port 32 in the receiver mode of the external frontend device 14. Moreover, the mode switching circuit 66 may be configured to connect the transmitter channel 30 with the antenna port 32 in the transmitter mode of the external frontend device 14.

Optionally, the external frontend device 14 may comprise an IF correction circuit 68 with a comb-signal input 70. In an embodiment, the comb-signal input 70 is configured to receive a comb-signal 72. The IF correction circuit 68 is configured to correct the IF signal and/or the IF output signal based on the received comb-signal 72.

Therein, the received comb-signal 72 serves as an additional high-precision reference signal in time domain and/or in frequency domain in order to correct the IF signal and/or the IF output signal.

Figure 3:
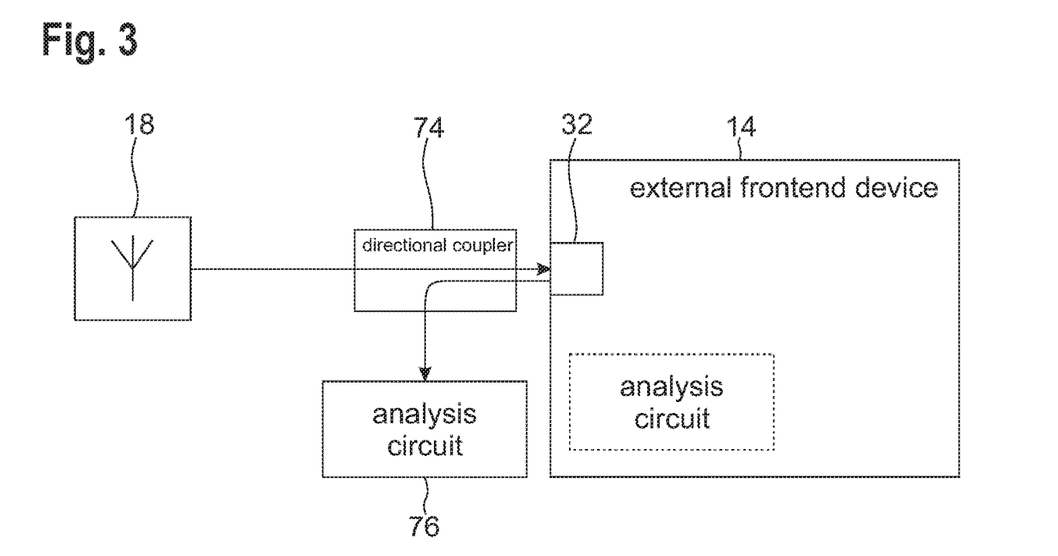
FIG. 3 schematically shows another embodiment of the external frontend device of FIG. 2.

FIG. 3 shows another embodiment of the external frontend device 14, wherein only the differences compared to the embodiment of the external frontend device 14 described above are described in the following.

In the embodiment shown in FIG. 3, the antenna port 32 of the external frontend device 14 is connected with a directional coupler 74 and with an analysis circuit 76. It is noted that while the directional coupler 74 and the analysis circuit 76 are established separately from the external frontend device 14, the directional coupler 74 and/or the analysis circuit 76 may also be integrated into the external frontend device 14.

The analysis circuit 76 may be established as a separate measurement device, such as a spectrum analyzer, a signal analyzer, a vector network analyzer, or an oscilloscope. Alternatively, the analysis circuit 76 may be integrated into the electronic device 16.

In general, the directional coupler 74 and the analysis circuit 76 are configured to perform reflectivity measurements that are associated with the antenna port 32. In the embodiment shown in FIG. 3, the directional coupler 74 is configured to forward electric signals reflected at the antenna port 32 to the analysis circuit 76. In other words, a reflected portion of the RF signal that is transmitted from the RF antenna 18 to the antenna port 32 is forwarded to the analysis circuit 76 by the directional coupler 74.

The analysis circuit 76 may determine a reflection parameter based on an analysis of the reflected portion. The reflection parameter may be an S11 parameter of the external frontend device 14 or of the antenna port 32.

In some embodiments, the analysis circuit 76 is configured to determine a voltage standing wave ratio (VSWR), i.e., a ratio between the transmitted standing waves and the reflected standing waves of the RF signal that is transmitted from the RF antenna 18 to the antenna port 32.

Figure 4:
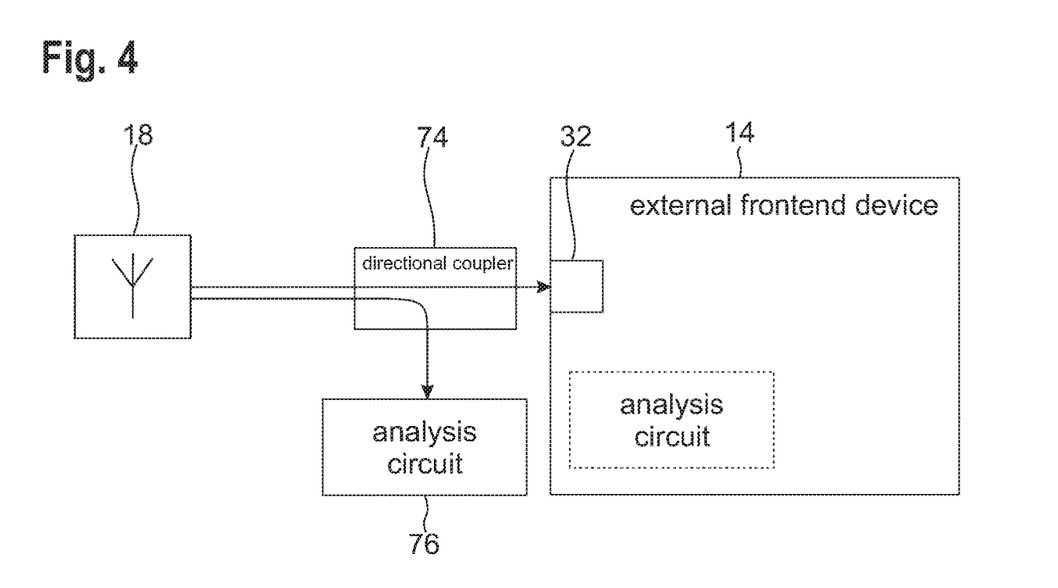
FIG. 4 schematically shows another embodiment of the external frontend device of FIG. 2.

FIG. 4 shows another embodiment of the external frontend device 14, wherein only the differences compared to the embodiment the external frontend device 14 described above with reference to FIG. 3 are described in the following.

In the embodiment shown in FIG. 4, the directional coupler 74 is configured to forward electric signals reflected at the RF antenna 18 to the analysis circuit 76. In other words, a reflected portion of the RF signal that is transmitted from the antenna port 32 to the RF antenna 18 is forwarded to the analysis circuit 76 by the directional coupler 74.

Accordingly, the reflection parameter determined by the analysis circuit 76 may relate to an S11 parameter of the RF antenna 18 and/or to a ratio between the transmitted standing waves and the reflected standing waves of the RF signal that is transmitted from the antenna port 32 to the RF antenna 18.

Figure 5:
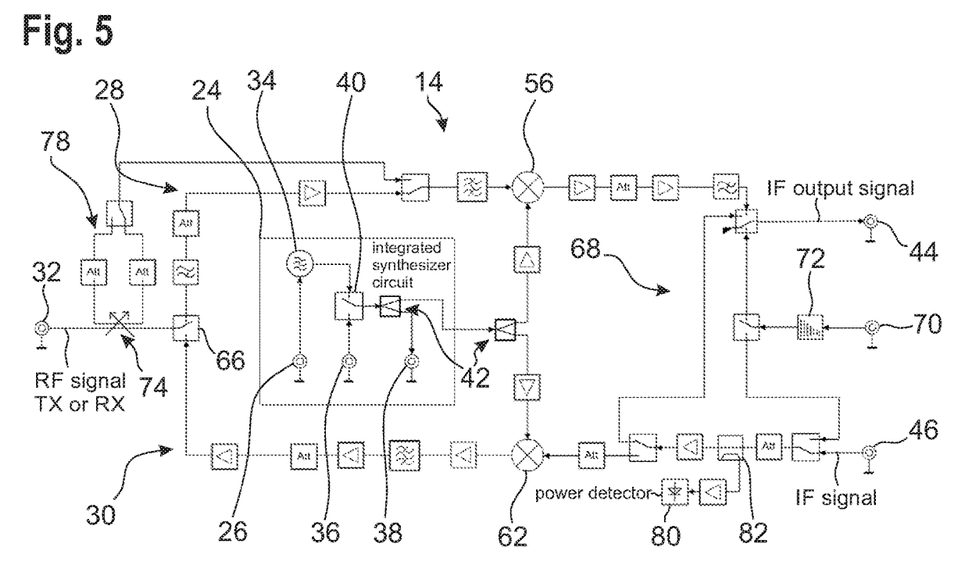
FIG. 5 schematically shows another embodiment of the external frontend device of FIG. 2.

FIG. 5 schematically shows another embodiment of the external frontend device 14, wherein only the differences compared to the embodiments described above are explained in the following.

In the embodiment shown in FIG. 5, the directional coupler 74 is integrated into the external frontend device 14. For example, the directional coupler 14 is interconnected between the antenna port 32 and the mode switching circuit 66.

The directional coupler 14 is connected with the receiver channel 28 by suitable connection circuitry 78 such that backward-travelling waves are forwarded to the receiver channel 28. Alternatively or additionally, forward-travelling waves may be forwarded back to the receiver channel 28 by the directional coupler 14 and the connection circuitry 78. The corresponding waves/signals may then be processed by the receiver channel 28 analogously to the received RF signal, as described above.

Generally, the directional coupler 74 may provide backward-travelling waves and forward-travelling waves in a separate manner such that they can be analyzed independently of each other, thereby ensuring determination of scattering parameters of the respective signals irrespective of their origin. In addition, the scattering parameters may be used for network analysis in general.

The respective waves, for example the backward-travelling waves, may be associated with reflected signals picked up by the directional coupler 74, for example signals reflected at the RF antenna 18. The respective waves, for example the forward-travelling waves, may be associated with an RF signal obtained by the transmitter channel 30.

For instance, an IF output signal corresponding to the reflected signal or to the RF signal obtained by the transmitter channel 30 is obtained, and may be analyzed by the electronic device 16.

According to the embodiment shown in FIG. 5, the external frontend device 14 may further comprise a power detector 80 that may be connected to the IF correction circuit 68 by a further directional coupler 82. For example, the power detector 80 may be configured to perform power measurements in order to correct the IF signal and/or the IF output signal. Alternatively or additionally, the power detector 80 may be configured to perform power measurements in order to calibrate the external frontend device 14.

Generally, network analysis can be done by using the external frontend device 14, for example the one shown in FIG. 5.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of hardware circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors, such as, for example, microprocessors, or portions thereof and accompanying software, firmware, hardware, and the like.

In some examples, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, devices, etc., capable of implemented the functionality described herein.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect electrical or mechanical connections, couplings, and mountings.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive porperty or privilege is claimed are defined aas follows:

1. An external frontend device, comprising:
   an integrated synthesizer circuit;
   a reference signal input configured to receive a low-frequency reference signal from an electronic device that is established separately in a housing separate from the external frontend device, wherein the reference signal input is configured to forward the received low-frequency reference signal to the integrated synthesizer circuit, and wherein the integrated synthesizer circuit is configured to generate a local oscillator (LO) signal based on the low-frequency reference signal;
   a channel arrangement comprising a receiver channel or a transmitter channel or a receiver channel and a transmitter channel;
   at least one mixer circuit associated with the receiver channel or with the transmitter channel or with both the receiver channel and the transmitter channel, wherein the at least one mixer circuit is configured to mix the LO signal with a radio frequency (RF) signal processed by the receiver channel or with an intermediate frequency (IF) signal processed by the transmitter channel or with both a radio frequency (RF) signal processed by the receiver channel and an intermediate frequency (IF) signal processed by the transmitter channel, thereby obtaining an IF output signal or an RF output signal or both an IF output signal and an RF output signal, respectively; and
   an IF correction circuit including a comb-signal input, wherein the comb-signal input is configured to receive a comb-signal, wherein the IF correction circuit is configured to correct one or more of the IF signal or the IF output signal based on the received comb-signal, and wherein the IF correction circuit is established separately from the integrated synthesizer circuit.

2. The external frontend device of claim 1, wherein the integrated synthesizer circuit comprises a YIG oscillator, wherein the YIG oscillator is configured to generate the LO signal based on the low-frequency reference signal.

3. The external frontend device of claim 1, wherein a frequency of the low-frequency reference signal is smaller than or equal to 2 GHz.

4. The external frontend device of claim 1, wherein a frequency of the low-frequency reference signal is smaller than or equal to 1 GHz.

5. The external frontend device of claim 1, wherein a frequency of the low-frequency reference signal is smaller than or equal to 650 MHz.

6. The external frontend device of claim 1, wherein a frequency of the low-frequency reference signal is smaller than or equal to 20 MHz.

7. The external frontend device of claim 1, further comprising an antenna port being connectable to at least one RF antenna.

8. The external frontend device of claim 7, further comprising at least one directional coupler and an analysis circuit, wherein the directional coupler and the analysis circuit are connected to the antenna port.

9. The external frontend device of claim 8, wherein the directional coupler is configured to forward electric signals reflected at the antenna port to the analysis circuit.

10. The external frontend device of claim 8, wherein the directional coupler is configured to forward electric signals reflected at an RF antenna that is connected with the antenna port to the analysis circuit.

11. The external frontend device of claim 8, wherein the analysis circuit is configured to determine a voltage standing wave ratio (VSWR).

12. The external frontend device of claim 1, wherein at least one of the RF signal and the RF output signal is a modulated signal.

13. The external frontend device of claim 1, wherein the at least one mixer circuit includes a first mixer circuit associated with the receiver channel and a second mixer circuit associated with the transmitter channel.

14. The external frontend device of claim 1, wherein a frequency of the IF signal and/or a frequency of the IF output signal is between 2 and 10 GHz.

15. The external frontend device of claim 1, wherein a frequency of the RF signal and/or a frequency of the RF output signal is between 20 and 80 GHz.

16. A frontend system comprising at least two external frontend devices according to claim 1.

17. The frontend system according to claim 16, wherein the at least two external frontend devices are cascaded.

18. An external frontend device, comprising:
an integrated synthesizer circuit;
a reference signal input configured to receive a low-frequency reference signal from an electronic device that is established separately from the external frontend device, wherein the external frontend device is configured to be placed in a test chamber, wherein the electronic device is a measurement instrument or a signal generator placed outside the test chamber, wherein a frequency of the low-frequency reference signal is smaller than or equal to 2 GHz, wherein the reference signal input is configured to forward the received low-frequency reference signal to the integrated synthesizer circuit, and wherein the integrated synthesizer circuit is configured to generate a local oscillator (LO) signal based on the low-frequency reference signal;
a receiver channel and/or a transmitter channel;
at least one mixer circuit associated with the receiver channel and/or with the transmitter channel, wherein the at least one mixer circuit is configured to mix the LO signal with a radio frequency (RF) signal processed by the receiver channel and/or or with an intermediate frequency (IF) signal processed by the transmitter channel, thereby obtaining an IF output signal and/or or an RF output signal, respectively;
an IF correction circuit comprising a comb-signal input, wherein the comb-signal input is configured to receive a comb-signal, wherein the IF correction circuit is configured to correct the IF signal and/or the IF output signal based on the received comb-signal, and wherein the IF correction circuit is established separately from the integrated synthesizer circuit; and
a power detector connected to the IF correction circuit, wherein the power detector is configured to perform power measurements in order to correct the IF signal and/or the IF output signal.

19. The external frontend device of claim 1, wherein the external frontend device is configured to be placed in a test chamber, and wherein the electronic device is a measurement instrument or a signal generator placed outside the test chamber.

* * * * *